United States Patent
Ma

(10) Patent No.: US 7,680,153 B2
(45) Date of Patent: Mar. 16, 2010

(54) METHOD AND DEVICE FOR STREAM SYNCHRONIZATION OF REAL-TIME MULTIMEDIA TRANSPORT OVER PACKET NETWORK

(76) Inventor: Hui Ma, 518129, Huawei Administration Building, Bantian, Longgang District, Shenzhen, Guangdong Province, 518129 (CN)

( * ) Notice: Subject to any disclaimer, the term of this patent is extended or adjusted under 35 U.S.C. 154(b) by 543 days.

(21) Appl. No.: 11/546,182

(22) Filed: Oct. 11, 2006

(65) Prior Publication Data

US 2007/0081562 A1    Apr. 12, 2007

(30) Foreign Application Priority Data

Oct. 11, 2005    (CN) .................. 2005 1 0100293

(51) Int. Cl.
    *H04J 3/06*    (2006.01)
(52) U.S. Cl. .................. 370/503; 370/516
(58) Field of Classification Search .................. None
    See application file for complete search history.

(56) References Cited

U.S. PATENT DOCUMENTS

| | | | |
|---|---|---|---|
| 5,570,372 A * | 10/1996 | Shaffer | 370/468 |
| 5,719,942 A * | 2/1998 | Aldred et al. | 709/228 |
| 6,249,319 B1 | 6/2001 | Post | |
| 6,438,702 B1 * | 8/2002 | Hodge | 713/400 |
| 2003/0112758 A1 * | 6/2003 | Pang et al. | 370/235 |
| 2004/0037325 A1 | 2/2004 | Busch | |
| 2005/0060753 A1 * | 3/2005 | Lundblad et al. | 725/100 |
| 2005/0083437 A1 | 4/2005 | Uchida et al. | |

FOREIGN PATENT DOCUMENTS

| | | |
|---|---|---|
| CN | 1206536 | 1/1999 |
| EP | 0920219 A2 * | 2/1999 |
| JP | 2002202404 | 7/2002 |
| WO | WO 2004-045197 | 5/2004 |

* cited by examiner

Primary Examiner—Huy D Vu
Assistant Examiner—James P Duffy

(57) ABSTRACT

A method for stream synchronization of real-time multimedia transport over a packet network, in which the multimedia includes a first stream and a second stream which are buffered and played through buffers. The method includes: measuring average transport delays of the first and second streams; measuring transport delay jitters of the first and second streams; and calculating a delay difference between the first and second streams which corresponds to the average transport delays and the transport delay jitters of the first and second streams, and setting buffer durations. A device for stream synchronization of real-time multimedia transport over a packet network is also provided.

15 Claims, 3 Drawing Sheets

METHOD AND DEVICE FOR STREAM SYNCHRONIZATION OF REAL-TIME MULTIMEDIA TRANSPORT OVER PACKET NETWORK

FIELD OF THE INVENTION

The present invention relates to the real-time multimedia transmission in a packet network, and in particular to a method and device for stream synchronization of real-time multimedia transport over a packet network.

BACKGROUND OF THE INVENTION

With the rapid development of Internet, stream media technologies are applied so widely that they have been used for broadcast, movie playing, remote education over Internet, online news web sites and the like.

Approaches for video and audio transport over Internet mainly include Download and Streaming. Continuous time-based media in streaming over Internet are called stream media, and the corresponding video and audio stream media are usually called video streams and audio streams.

In streaming, video/audio signals are transported in a continuous way. A part of the stream media is played at a client while the rest is downloaded at the background.

The streaming includes Progressive Streaming and Real-time Streaming. The real-time streaming refers to real-time transport, particularly suitable for a spot event, and should be provided with a connection bandwidth, which means that the quality of images may be degraded due to a lowered Internet speed, so as to reduce the demand for transport bandwidth. "Real time" refers to such an application in which the delivery of data must be kept in a precise time-based relationship with the generation of data.

At present, the stream media transport usually adopts Real-time Transport Protocol (RTP) and Real-time Transport Control Protocol (RTCP). RTP is a transport protocol for multimedia data streams over Internet, which was released by Internet Engineering Task Force (IETF). RTP is defined to be operable for a one-to-one or one-to-many transport for providing time information and stream synchronization. RTP is typically applied over User Datagram Protocol (UDP), and also over Transport Control Protocol (TCP), Asynchronous Transfer Mode (ATM) or any other protocol. RTP itself ensures only the real-time data transport, but fails to provide either a reliable transport mechanism for progressive transport of data packets or traffic or congestion control, all of which are provided merely by means of RTCP. RTCP is responsible for a management on the transport quality and an exchange of control information between active application processes. During an RTP session, each participant transports periodically RTCP packets which contain statistics data including the number of data packets sent, the number of lost data packets and the like. Thus, a server can make use of such information to change the transport rate dynamically and even the payload type. An interoperation of RTP and RTCP can optimize the transport efficiency with an effective feedback and minimum overhead, which is hence particularly suitable for real-time data transport over Internet.

RTP defines a timestamp-based synchronization method for a receiver to correctly restore the sequence of multimedia data packets and to play them. The timestamp field is, in an RTP header, indicative of time synchronization information for data packets, and is critical for the data to be restored in a proper time order. The value of the timestamp defines the Sampling Instant of the first byte of a data packet, and defines that the clock for the transmitter timestamp shall be continuous with a monotonous increase, even if there is no data to be received or transmitted. In a silent case, the transmitter has no data to be transmitted and the timestamp keeps increasing, while the receiver can be aware of no loss of data due to no loss of serial numbers of the received data packets, and can determine the time interval at which the data is output with a comparison between timestamps of a previous and a subsequent packets. The initial timestamp for a session should be selected randomly, and the unit of timestamp can be determined by the payload type.

In addition, the multimedia transport generally refers to a mixed transport of various streams which need to be played simultaneously. Therefore, how to synchronize various streams will be a major issue for multimedia stream transport. RTCP plays an important role of enabling the receiver to synchronize multiple RTP streams. When audio and video data are transported together, for instance, two streams are used for transport respectively under RTP due to their different coding, and the timestamps of the two streams run at different rates. In this case, the receiver shall synchronize the two streams for consistency of voices with images.

For the synchronization of streams, RTCP requires that the transmitter shall assign a Canonical Name uniquely identifying a data source to each stream to be transported, and different streams from the same data source have the same canonical name. Thus, the receiver can be aware of which streams are associated. Information contained in a report message from the transmitter can be used for the receiver to coordinate the timestamps in the two streams. The report from the transmitter includes an absolute time value in a format of Network Time Protocol (NTP), and this value is generated by the clock which generates the timestamp field of the RTP packet. Since the same absolute time is used to all the streams and reports from the transmitter, the receiver can compare the absolute times of two streams from the same data source so as to determine how to map the timestamp value in one of the stream to the timestamp value in the other.

Nevertheless, since multimedia streams, such as audio streams, video streams, etc., have different transport paths and environments, and network transport situations are in a complex variation and unpredictable, a delay and a jitter to the transport of audio and video streams may be caused. In order to eliminate the jitter phenomena, the receiver buffers the multimedia streams when receiving them, that is, buffers the received data packets using a buffer, and then synchronizes and plays them. Due to the jitter and buffer process, the synchronization for various streams becomes much more complex than before, and satisfactory synchronization would be out of reach with only RTP/RTCP.

The synchronization between an audio stream and a video stream is called Lip Synchronization, which is a major issue for multimedia transport. To enable voices and images to better express, the lip synchronization is used for consistency of the voices with the images, so that the audio stream expresses in real-time consistence with the images. A crucial issue is how to incorporate prior multimedia real-time transport technologies to realize the lip synchronization in a packet network environment.

To eliminate the jitter, a jitter buffer is provided at the receiver of the prior multimedia transport network. The jitter buffer is provided with a certain buffer depth and a fixed delay. For example, FIG. 1 is a schematic diagram illustrating two jitter buffers and their operating mechanisms in the prior art, where the jitter buffers 110 and 120 for audio and video streams are respectively provided with fixed delays A1 and A2. Once the time for playing the delayed media stream data in the buffers expires, the audio and video streams are respectively played.

In the prior art, since each stream has a fixed delay in the jitter buffer, the buffer can eliminate the effect resulted from the jitter, and a compensation synchronization offset can be determined based on the delay between two streams. However, the fixed delay is merely applicable for a relatively stable network. For transport over a packet network, two independent streams have different paths and different Quality of Service registrations, and hence the audio and video streams have different delays in the transport over the network. In addition, the jitter may cause the transport delays over the network to vary greatly and become unstable, so that the fixed delay in the jitter buffer can not compensate for the synchronization offset, which ultimately results in that the audio and video streams are in an absence of synchronization and the lip synchronization fails.

In practical applications, it can be concluded from the above solution: firstly, the delays of the audio and video streams in the jitter buffers are fixed and can not be adjusted dynamically, which can not be adapted to network variations. For example, in case of good network condition, the multimedia streams can be transported rapidly, and a large buffer delay may result in a systematic delay waste; and in case of a poor network condition, the jitter may be too strong to be eliminated, which may cause two streams to be in an absence of synchronization, failing to attain the synchronization effect.

Secondly, the compensation synchronization offset between two streams is fixed due to the fixed delays. When the network conditions vary, for example, becomes better or worse, the synchronization offset varies accordingly. However, the synchronization offset between two streams may be increased after the synchronization processing.

Thirdly, the audio and video streams are processed separately and share no synchronization reference between each other while being synchronized. Instead, the two streams are synchronized by introducing the fixed delays, which can not be adjusted in accordance with a feedback from the result of the synchronization between two streams.

In the prior art, a fixed delay is set for respective streams of multimedia streams, i.e., audio and video streams, which is buffered in jitter buffers without adjusting mechanism.

SUMMARY OF THE INVENTION

Embodiments of the present invention provide a method and device for stream synchronization of real-time multimedia transport over a packet network, which can overcome the network jitters and variations through a simple and effective adjustment so as to achieve synchronization between streams.

An embodiment of the present invention provides a method for stream synchronization of real-time multimedia transport over a packet network, in which the multimedia includes a first stream and a second stream which are buffered and played through respective buffers at receivers. The method includes:

measuring average transport delays of the first and second streams respectively;

measuring transport delay jitters of the first and second streams respectively; and calculating a delay difference between the first and second streams which corresponds to the average transport delays and the transport delay jitters of the first and second streams, and setting buffer durations in the first and second stream buffers so as to be adapted to the delay difference.

Optionally, the method further includes the steps of:

one of the first and second stream buffers periodically providing its play instant as a synchronization reference to the other buffer, and the other buffer adjusting its play in accordance with the synchronization reference point.

Optionally, the average transport delays are calculated from transmitting and receiving instants of data packets of the first and second streams.

Optionally, the calculation of the average transport delays includes:

calculating transport delay of a current multimedia data packet; and modifying iteratively and enabling the average transport delay to approach the transport delay of the current multimedia data packet.

Optionally, the step of setting buffer durations in the first and second stream buffers so as to be adapted to the delay difference includes:

if the average transport delays of the first and second streams have a difference within a tolerable synchronization offset range and are both smaller than maximum buffer durations in the corresponding buffers, setting the buffer durations in the buffers to the transport delays;

if the difference between the average transport delays of the first and second streams goes beyond the tolerable synchronization offset range, defining either of the average transport delays to enable the delay difference be within the synchronization offset range; and if the average transport delays of the first and second streams go beyond the maximum buffer durations, defining the buffer durations in the buffers as the maximum buffer duration.

Optionally, the first stream is an audio stream, and the second stream is a video stream.

Another embodiment of the present invention provides a device for stream synchronization of real-time multimedia transport over a packet network, in which the multimedia includes a first stream and a second stream. The device includes a first stream buffer, a second stream buffer, a delay detection module and a synchronization module, in which:

the first and second stream buffers are adapted to calculate transport delay jitters of the first and second streams respectively;

the delay detection module is adapted to calculate average transport delays of the first and second streams; and the synchronization module is adapted to calculate buffer durations in the first and second stream buffers in accordance with the average transport delays and the transport delay jitters of the first and second streams.

Optionally, one of the first and second stream buffers periodically provides its play instant as a synchronization reference point to the other buffer, and the other buffer adjusts its play in accordance with the synchronization reference point.

Optionally, the delay detection module calculates the average transport delays in accordance with transmitting and receiving instants of data packets of the first and second streams.

Optionally, the delay detection module calculates the average transport delays with an iterative algorithm.

In the embodiments of the present invention, the buffers are provided for flexibly adjusting the buffer durations in the buffers in accordance with network delay information, which adjusts the respective buffer durations for the first and second streams so as to attain the synchronization therebetween; the delay detection module is provided for detecting the transport delays of the first and second streams in the packet network; and the synchronization module is provided for synchronizing the first and second streams with reference to the average transport delays and the transport delay jitters of the first and second streams, and for calculating and flexibly configuring the buffer durations in the first and second jitter buffers so as to resist the network transport jitter and to adjust both of the jitter buffers for synchronous play. That is, the synchronization of streams can be implemented conveniently and rapidly through the detections of the network transport delays and jitters.

Moreover, one of the audio and video jitter buffers provides a synchronization reference point to the other so as to address the synchronization therebetween and to improve the precision of lip synchronization. In combination with the mechanism for a synchronization cross-reference point between the audio and video streams, it is possible to implement the synchronization between the audio and video streams accurately, conveniently and rapidly and to improve the Quality of Service and execution efficiency for multimedia transport over the network, which can be advantageous particularly to the market expanding and the service promotion for service providers.

DETAILED DESCRIPTION OF THE INVENTION

Hereinafter, in order to make the objects, aspects and advantages of the present invention more apparent, embodiments of the present invention will be described with reference to the attached drawings.

Since an IP packet network is not a connection-oriented network and provides merely best-effort service, the Quality of Service in the network can not be guaranteed. Data transport has to be subject to time delay and jitter over the network. Thus, audio and video streams will be in an absence of synchronization during transport of a multimedia traffic, which will degrade effects expressed by images and voices. The embodiments of the present invention aim to eliminate the degradation resulted from packet network with a relatively small systematic delay, in order to realize lip synchronization process for the audio and video streams ultimately.

The embodiments of the present invention can realize lip synchronization between audio and video streams by means of buffer which dynamically adjusts the buffer duration based on analyses of information on the transport delays and jitters of the audio and video data packets in the packet network. A delay detection module is provided at the front-end, which calculates a relative transport delay in accordance with transmitting and receiving instants of the data packets. The buffers perform statistics of jitters of the delays and transfer the jitters to a synchronization module which calculates the buffer duration in the buffers and informs the same of the buffers. Wherein, both of the buffers for the two streams set the buffer duration in accordance with parameters provided by the synchronization module. Moreover, the buffers provide its play instant as a synchronization reference point for each other respectively, so as to improve the precision of lip synchronization.

Figure 1:
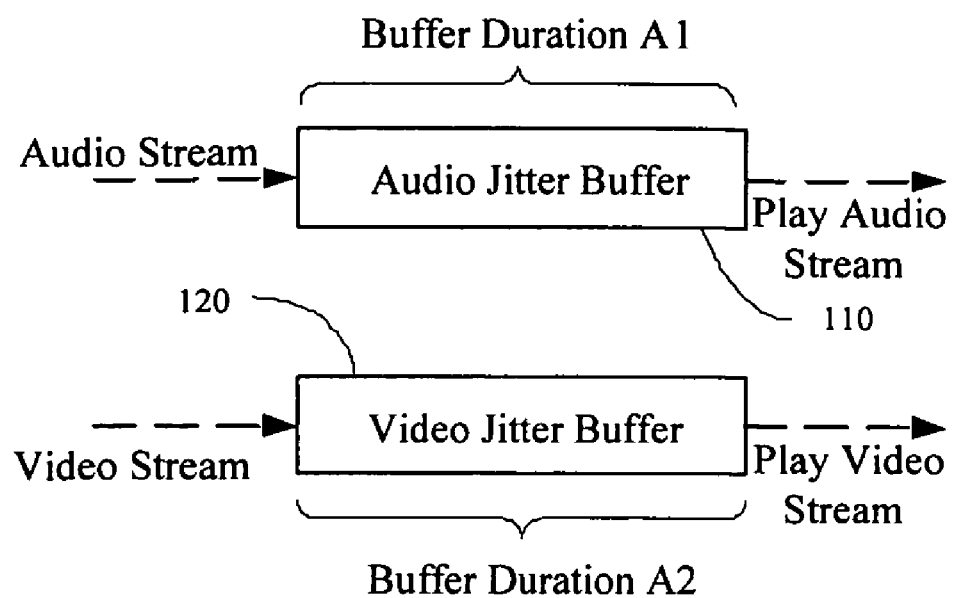
FIG. 1 is a schematic diagram of a lip synchronization device for multimedia transport over a network in the prior art.
Figure 2:
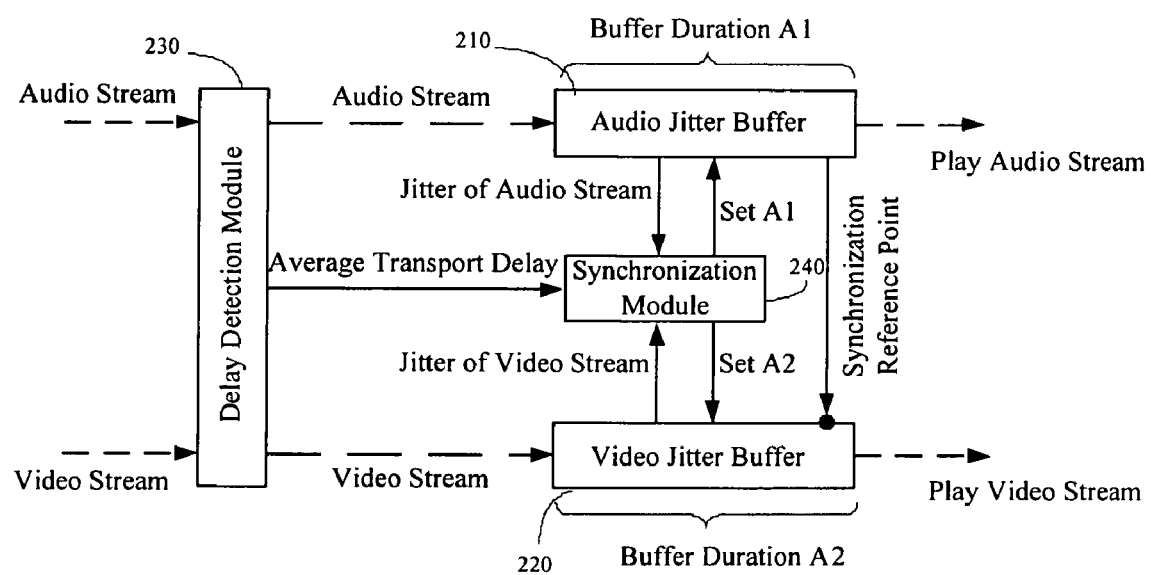
FIG. 2 is a schematic diagram of a lip synchronization device for multimedia transport over a network according to an embodiment of the present invention.

The present invention will be further described in connection with the embodiments thereof. FIG. 2 is a block diagram of a lip synchronization device for real-time multimedia transport over an IP network according to the first embodiment of the present invention, illustrating functions and interoperability of respective modules. It can be seen that in the lip synchronization device for real-time multimedia transport, buffers, i.e. an audio jitter buffer 210 and a video jitter buffer 220, are provided for audio and video streams respectively. Multimedia data are buffered at the receiver through the respective buffers and played. As illustrated in FIG. 2, the audio and the video jitter buffers 210 and 220 have respective buffer durations of A1 and A2.

As mentioned above, a certain delay will occur for multimedia stream transport over the packet network, and the delay variation refers to jitter of the network. Different data packets correspond to different delays, and the jitter refers to the extent, variance or range of the delay variation. Due to the jitter of network, the multimedia data packets arrive at different intervals, which results in an absence of fluency or continuity of play, and in this case, the buffers can avoid or eliminate the effects due to the jitter. A jitter buffer is a buffer in physics, where audio or video frames are buffered for a sufficient period and played. The size of buffer reflects the capability of resisting the network jitter.

In contrast to the prior art, the lip synchronization device according to an embodiment of the present invention further includes a delay detection module 230 and a synchronization module 240, and both of the buffer durations A1 and A2 are adjustable dynamically. The synchronization module 240 calculates the optimum value of the buffer durations A1 and A2 in the audio and video jitter buffers 210 and 220 in accordance with average transport delays of the audio and video streams as well as the jitters of transport delays, and informs the jitter buffers of adjusting the buffer durations therein. In order to obtain such information as the jitters of delays and the like, the delay detection module 230 is provided for calculating the average transport delays of the audio and video streams. Furthermore, the jitter buffers 210 and 220 also calculate the jitters of transport delays of the audio and video streams.

It can be seen that the essential principle for the lip synchronization device according to an embodiment of the present invention lies in that the synchronization module 240 adjusts the difference between delays in the jitter buffers 210 and 220 in real time respectively in accordance with the network transport situations. The delay difference refers to a synchronization offset from play to receipt of the two streams. With an adjustment on the delays of the two streams, it is possible to eliminate effects of the jitter for each stream and to generate the offset to compensate for the absence of synchronization due to the difference between network transports.

As the play proceeds, the accumulated difference between the synchronization reference instants may become bigger due to technological and methodological efforts. In view of this, the second embodiment of the present invention introduces an update mechanism with a synchronization reference instant between the two streams based on the first embodiment of the present invention. That is, one of the jitter buffers 210 and 220 for the audio and video streams periodically provides its play instant as the synchronization reference instant to the other which in turn adjusts the other's play in accordance with the synchronization reference instant. Such a mechanism enables the audio and video streams to reestablish a uniform synchronization reference in one period, and avoids any potential risk of an absence of synchronization due to the accumulated errors.

The interoperability between the respective modules as mentioned above will be described below. The synchronization module 240 obtains information such as the network delay, the jitter of audio and video streams from the delay detection module 230, the audio jitter buffer 210 and the video jitter buffer 220, and also provides the audio jitter buffer 210 and the video jitter buffer 220 with information for setting the buffer durations.

The third embodiment of the present invention, based on the second embodiment of the present invention, performs real-time detection with the method that performs calculation and statistics of the delay based on transmitting instants of data packets over the network. The delay detection module calculates the average transport delay in accordance with the transmitting and receiving instants of data packets of the audio and video streams.

The relative transport delay between each audio packet and each video packet over the network is determined in accordance with the arriving and transmitting instants of the audio and video streams. Here, each data packet when being sent is labeled with a time stamp under RTP protocol, and thus the receiver can be aware of the transmitting instant in accordance with the time stamp. Additionally, it is called the relative delay here for the reason that the absolute instants of the transmitter and receiver may be not identical, and the relative instant can be calculated instead.

It shall be noted that what the delay detection module performs statistics of an average delay, and hence there is need to use an iterative algorithm to gradually accumulate and calculate the average delay for the current instant in accordance with all historical delays of previous data packets. According to the fourth embodiment of the present invention, the iterative algorithm can be used to calculate the average delay of the network. Similarly, the iterative algorithm is used in the jitter buffers to perform calculation and statistics of the average network jitter in accordance with each set delay. The specific flow for iterative algorithm will be described in detail hereinafter.

The fifth embodiment of the present invention, based on the third embodiment of the present invention, provides a different synchronization module. As can be seen from the above solution, the input parameters to the synchronization module include an audio jitter value, a video jitter value, and values of transport delays of audio and video streams over the network. Upon receipt of the above information, the synchronization module compares the delay value and jitter value of the audio stream with the delay value and jitter value of the video stream respectively and thereby adjusts the difference between the delays of the audio and video streams for the synchronization therebetween. In the end, the delays of A1 and A2 are set respectively for the audio and video jitter buffers.

Wherein, the principle for the synchronization module to calculate the buffer durations in the audio and video jitter buffers lies in that the buffer durations are set in such a way that the synchronization offset can be within a predetermined range and be as small as possible. Specifically, it shall be taken into account that if the average transport delays of the audio and video streams have a difference within a tolerable range of synchronization offset and are both smaller than a maximum buffer duration, the buffer durations in the buffers are set to the transport delays; if the difference between the average transport delays of the audio and video streams goes beyond the tolerable range of synchronization offset, either of the average transport delays is defined within the range of synchronization offset; and if the average transport delays of the audio and video streams go beyond the maximum buffer duration, the buffer durations in the audio and video jitter buffers are set to the maximum buffer duration. Hereinafter, it will be described in detail with respect to how the synchronization module performs comparison, determination and setting.

For more clear description of operating mechanism of a lip synchronization device for real-time multimedia transport over a packet network according to the embodiments of the present invention, a dynamical operating procedure will be given as below for the above device.

The delay detection module processes audio and video streams from the packet network side and calculates and provides the transport time over the network to the synchronization module. The dynamical jitter buffers calculate respective network jitter values for the audio and stream streams passing there through and provide the synchronization module with the values. The synchronization module, in accordance with the above four input parameters and a certain algorithm, calculates respectively the buffer duration A1 in the audio jitter buffer and the buffer duration A2 in the video jitter buffer, and provides A1 and A2 to the audio and video jitter buffers for update of their buffer durations. The audio jitter buffer calculates an audio play instant and an audio frame corresponding to the play, and sends the play instant to the video jitter buffer as its play synchronization reference point. Of course, it is also possible for the video jitter buffer to calculate and send a play instant to the audio jitter buffer. The video buffer calculates and adjusts play of video frames in the video jitter buffer in accordance with the synchronization reference point and the value of A2. Thus, the synchronous play of audio and video streams, i.e. the lip synchronization, can be achieved.

Those skilled in the art will appreciate, the arrangements and functions for modules in the above embodiments can be embodied in any way other than as described above, for example, the synchronization module can be physically integrated with the audio jitter buffer so as to together perform the calculation of synchronization information and the processing of audio jitter, or the delay detection module is integrated with the synchronization module, so as to together perform the calculations of transport delays and of the synchronization information, or even the synchronization module is integrated with the video jitter buffer so as to together perform the calculation of synchronization information and the processing of video jitter, etc. For example, the video jitter buffer can be arranged to send a synchronization reference point to the audio jitter buffer. However, these different arrangements share the same implementation principle and are intended for the same inventive object without departing from the scope of the present invention.

Figure 3:
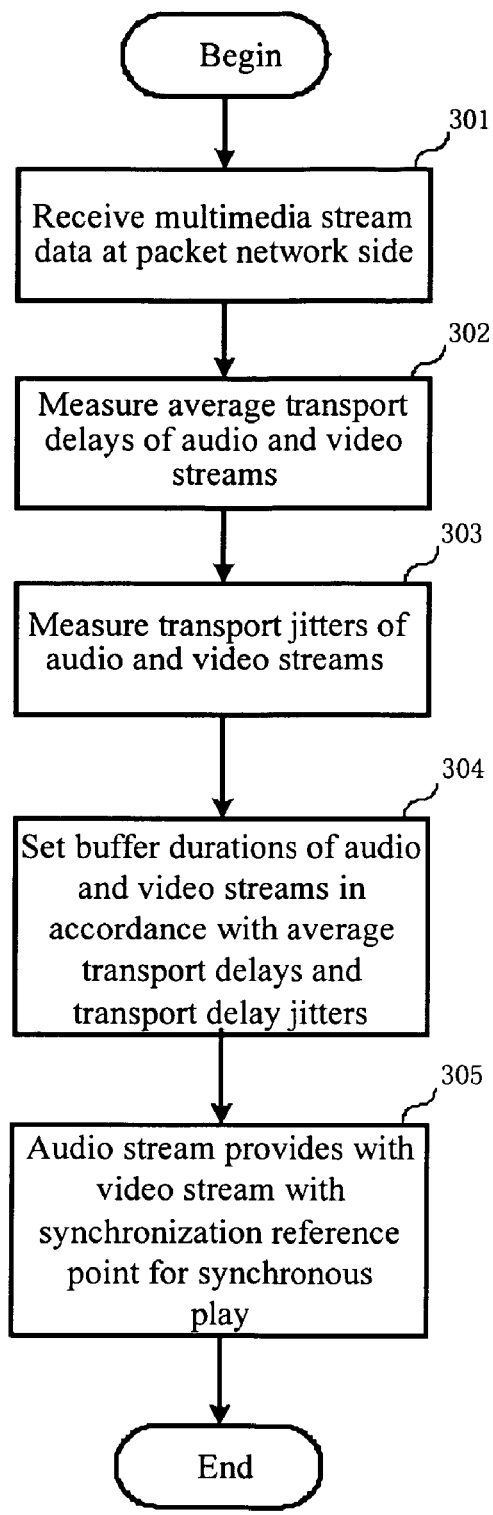
FIG. 3 is a flow chart of a lip synchronization method for multimedia transport over a network according to an embodiment of the present invention.

For the above described lip synchronization device for real-time multimedia transport over the network, a corresponding operating flow will be given hereinafter, that is, a lip synchronization method for real-time multimedia transport over the network according to the sixth embodiment of the present invention, as illustrated in FIG. 3.

In step 301, multimedia stream data is received at the packet network side, including audio and video streams, which are buffered and played at the receiver through respective jitter buffers.

In step 302, average transport delays of the audio and video streams are measured respectively. As described above, the delay detection module calculates, at the packet network side, the average transport delays with the iterative algorithm based on transmitting and receiving instants of data packets of the audio and video streams.

In step 303, jitters of the transport delays of the audio and video streams are measured respectively, which is performed by the audio jitter buffer and the video jitter buffer respectively. Since the jitter buffers process and record delay intervals of the network data packets, variations in these intervals can be used to calculate the network jitter with the iterative algorithm.

In step 304, buffer durations in the audio and video jitter buffers are calculated and set in accordance with the average transport delays and the jitters of delays of the audio and video streams.

The principle for the synchronization module to calculate the buffer durations in the audio and video jitter buffers lies in that the buffer durations are set in such a way that the synchronization offset can be within a predetermined range and be as small as possible. Specifically, it shall be taken into account that if the average transport delays of the audio and video streams have a difference within a tolerable range of synchronization offset and are both smaller than a maximum buffer duration, the transport delays are set as the buffer durations in the jitter buffers; if the difference between the average transport delays of the audio and video streams goes beyond the tolerable range of synchronization offset, either of them is defined within the range of synchronization offset; and if the average transport delays of the audio and video streams go beyond the maximum buffer duration, the maximum buffer duration are set as the buffer durations in the audio and video jitter buffers.

In step 305, one of the audio and video jitter buffers periodically provides its play instant as a synchronization reference point to the other which in turn adjusts its play in accordance with the synchronization reference point. Thus, the lip synchronization can be achieved.

The seventh embodiment of the present invention, based on the sixth embodiment of the present invention, performs the procedure for calculating the average transport delays with the iterative algorithm as described in step 302, through the following steps.

Transmitting and receiving instants of the $i^{th}$ media data packet, S(i) and R(i), can be known from the timestamp of the data packet and a local clock. Thus, a relative transport delay is given as follows:

$$L(i)=R(i)-S(i)$$

Then, a formula for an iterative calculation of an average transport delay $\overline{L}$ can be as follows:

$$\overline{L} := \overline{L} + \frac{1}{N}[L(i) - \overline{L}]$$

Here, N is a relatively large constant which takes a value depending upon the precision of the average delay.

As can be seen that upon each receipt of a new data packet, a correction will be performed on the previous average delay to an extent depending upon on the size of the value of N. For example, the larger the value is, the smaller effect the current value has on the average delay; otherwise the larger value, the bigger effect. Therefore, N shall take an appropriate value in that if it is too large, the current network situation can not be reflected well, and if too small, streams can be subject to network fluctuation, both of which cases can not reflect the average effect. For example, N can be 16 in case of 32-bit $\overline{L}$.

The iterative method can be also applicable for estimation of the jitter by the jitter buffer in step 303. Thus, the difference between transport delays of the $i^{th}$ and $j^{th}$ packets, D(i,j), can be given as follows:

$$D(i,j)=[R(j)-R(i)]-[S(j)-S(i)]$$

The so-called network jitter can be defined as a standard difference of variations of the transport delays between different packets, i.e., an average of differences between the delays of different packets. Thus, the network jitter can be given as follows:

$$J := J + \frac{1}{M}[|D(i-1, i)| - J]$$

Here, M is similar to the above N.

The eighth embodiment of the present invention, based on the sixth embodiment of the present invention, performs the step 304 in accordance with the following guideline, so that the values set for A1 and A2 can be determined in accordance with the average transport delay and the jitter.

It can be assumed that the synchronization offset as required by lip synchronization is within a range of $[-e_1, e_2]$, that is, the audio stream leads before the video stream with the maximum offset of $e_1$, the audio stream lags behind the video stream with the maximum offset of $e_2$. As a result of the lip synchronization, the offset between the two streams shall be within this range. Additionally, the maximum buffer depths of the jitter buffers are assumed to be $X_1$ and $X_2$, and generally $X_1 < X_2$, that is, $A_1$ (A1) and $A_2$ (A2) shall not exceed the maximum depths respectively.

If the synchronization offset between the audio and video streams exceeds the predetermined range, a relatively simple method will be described hereinafter which can determine the buffer durations $A_1$ and $A_2$ with only the calculated average network transport delays $L_1$, $L_2$ and the network jitters.

If $L_1 \geq L_2$, a common average delay can be subtracted as follows:

$$S_1=L_1-L_2+J_1; S_2=J_2;$$

If $S_1 \geq S_2$, it indicates that the audio stream lags behind the video stream, and it can be set such that $A_1=J_1; A_2=S_1;$ Otherwise, it indicates that the audio stream leads before the video stream, and it can be set such that $A_1=J_1+S_2-S_1; A_2=J_2$.

If $L_1 < L_2$, a common average delay can be subtracted as follows:

$$S_1=J_1; S_2=L_2-L_1+J_2;$$

If $S_2 \geq S_1$, it indicates that the audio stream leads before the video stream, and it can be set such that $A_1=S_2; A_2=J_2;$ Otherwise, it indicates that the audio stream lags behind the video stream, and it can be set such that $A_1=J; A_2=J_2+S_1-S_2$.

It can be concluded from the above guideline that: within a physically attainable scope, the buffer durations can be set such that the synchronization offset shall be within a determined range and be as small as possible. In this way, it is possible to calculate simply and rapidly the dynamical delays A1 and A2 of the audio and video streams for synchronization, to synchronize simply and rapidly the two streams in accordance with the synchronization reference point, and to dynamically calculate the minimum delay in accordance with different network situations so as to guarantee the quality of synchronization.

In conclusion, an embodiment of the present invention provides a lip synchronization method for real-time multimedia transport over a packet network, which brings great significance to the development of present network streaming services. The streaming technologies have been applied increasingly, and therefore the embodiment of the present invention is focused on real-time multimedia transport protocols including RTP/RTCP and the like. It has been experimentally evident that multiple demands on real-time transports can be satisfied simultaneously which have been applied in a remote monitoring system.

Moreover, although the embodiments have been explained by example of audio and video streams, the present invention shall not be limited thereto but can be applied to the synchronization between other different streams, and the descriptions thereof will not be repeated here.

While the present invention has been illustrated and described with reference to the preferred embodiments thereof, those skilled in the art shall appreciate that it is obvious to make various changes to the embodiments disclosed here in formality and detail without departing from the scope of the present invention.

What is claimed is:

1. A method for synchronizing multimedia streams transported over a packet network, the multimedia streams comprising a first stream and a second stream, the first and second streams being buffered and played through their respective buffering devices at receivers, the method comprising:
    measuring average transport delays of the first and second streams, respectively;
    measuring transport delay jitters of the first and second streams, respectively;
    calculating a delay difference between the first and second streams according to the average transport delays and the transport delay jitters of the first and second streams; and
    setting buffer durations in the first and second stream buffering devices according to the calculated delay difference;
    wherein in the event that a difference between the average transport delays of the first and second streams is within a tolerable synchronization offset range, and the average transport delays of the first and second streams are both smaller than maximum buffer durations in the corresponding buffering devices, setting the buffer durations in the buffering devices to the average transport delays;
    wherein in the event that the difference between the average transport delays of the first and second streams is larger than the tolerable synchronization offset range, setting either of the buffer durations so that the difference there between is within the synchronization offset range; and
    wherein in the event that both the average transport delays of the first and second streams are larger than the maximum buffer durations, setting the buffer durations in the buffering devices to be the maximum buffer duration.

2. The method according to claim 1, further comprising:
    one of the first and second buffering devices periodically providing its play time as a synchronization reference point to the other buffering device; and
    the other buffering device adjusting its play time in accordance with the synchronization reference point.

3. The method according to claim 2, wherein the average transport delays are calculated from transmitting and receiving instants of data packets of the first and second streams.

4. The method according to claim 3, wherein the calculation of the average transport delays comprises:
    calculating a transport delay of a current multimedia data packet; and
    calculating the average transport delay from an iteration of the transport delay of the current multimedia data packet and transport delays of one or more previous multimedia data packets.

5. The method according to claim 1, wherein the first stream is an audio stream, and the second stream is a video stream.

6. A device for synchronizing real-time multimedia streams transported over a packet network, the multimedia streams comprising a first stream and a second stream, and the device comprising:
    a first stream buffering device,
    a second stream buffering device,
    a delay detection module, and
    a synchronization module,
    wherein:
    the first and second stream buffering devices are adapted to buffer the first and a second streams, respectively, and to provide the synchronization module with calculated transport delay jitters of the first and second streams, respectively;
    the delay detection module is adapted to calculate average transport delays of the first and second streams, and to provide the synchronization module with calculated average transport delays; and
    the synchronization module is adapted to calculate a delay difference between the first and second stream according to the average transport delays and the transport delay jitters of the first and second streams, and to set buffer durations in the first and second stream buffering devices according to the calculated delay difference;
    wherein in the event that a difference between the average transport delays of the first and second streams is within a tolerable synchronization offset range, and the average transport delays of the first and second streams are both smaller than maximum buffer durations in the corresponding buffering devices, the buffer durations in the buffering devices are set to the average transport delays;
    wherein in the event that the difference between the average transport delays of the first and second streams is larger than the tolerable synchronization offset range, either of the buffer durations is set so that the difference there between is within the synchronization offset range; and
    wherein in the event that both the average transport delays of the first and second streams are larger than the maximum buffer durations, the buffer durations in the buffering devices are set to be the maximum buffer duration.

7. The device according to claim 6, wherein one of the first and second stream buffering devices is further adapted to periodically provide its play time as a synchronization reference point to the other buffering device, and the other buffering device is further adapted to adjust its play time in accordance with the synchronization reference point.

8. The device according to claim 7, wherein the delay detection module calculates the average transport delays in accordance with transmitting and receiving instants of data packets of the first and second streams.

9. The device according to claim 8, wherein the delay detection module calculates the average transport delays using an iterative algorithm.

10. The method according to claim 1, wherein the average transport delays of the first and second stream are calculated from transmitting and receiving instants of data packets of the first and second streams, respectively.

11. The method according to claim 10, wherein the calculation of an average transport delay of a stream comprises:

calculating a transport delay of a current multimedia data packet of the stream; and calculating the average transport delay of the stream from an iteration of the transport delay of the current multimedia data packet and transport delays of one or more previous multimedia data packets.

12. The device according to claim 6, wherein the first stream is an audio stream, and the second stream is a video stream.

13. The device according to claim 6, wherein the delay detection module is adapted to calculate the average transport delays in accordance with transmitting and receiving instants of data packets of the first and second streams.

14. The device according to claim 13, wherein the delay detection module is adapted to calculate the average transport delays using an iterative algorithm.

15. A method for synchronizing real-time multimedia streams transported over a packet network, the multimedia streams comprising a first stream and a second stream, the first and second stream being buffered and played through their respective buffering devices at receivers, comprising:

measuring a first average transport delay ($L_1$) of the first stream and a second average transport delay ($L_2$) of the second stream, respectively;

measuring a first transport delay jitter ($J_1$) of the first stream and a second transport delay jitter ($J_2$) of second stream, respectively;

calculating a delay difference between the first stream and the second stream according to the values of $L_1$, $L_2$, $J_1$ and $J_2$, and setting a first buffer durations ($A_1$) in the first stream buffering device and a second buffer durations ($A_2$) in the second stream buffering device according to the calculated delay difference;

wherein the first buffer duration $A_1$ and the second buffer duration $A_2$ are determined by the following conditions:

a) if $L_1 \geq L_2$, a first common average delay ($S_1$) of the first stream and a second common average delay ($S_2$) of the second stream are determined by:

$$S_1 = L_1 - L_2 + J_1; \text{ and } S_2 = J_2;$$

wherein if $S_1 \geq S_2$, the first and second buffer durations are $A_1 = J_1$ and $A_2 = S_1$;

otherwise, the first and second buffer durations are $A_1 = J_1 + S_2 - S_1$ and $A_2 = J_2$;

b) if $L_1 < L_2$, the first common average delay ($S_1$) of the first stream and the second common average delay ($S_2$) are determined by:

$$S_1 = J_1; \text{ and } S_2 = L_2 - L_1 + J_2;$$

wherein if $S_2 \geq S_1$, the first and second buffer durations are $A_1 = S_2$ and $A_2 = J_2$;

otherwise, the first and second buffer durations are $A_1 = J$ and $A_2 = J_2 + S_1 - S_2$.

* * * * *